(12) United States Patent
Sakashita et al.

(10) Patent No.: US 10,611,235 B2
(45) Date of Patent: Apr. 7, 2020

(54) GRILLE SHUTTER CONTROL DEVICE OF VEHICLE

(71) Applicant: MAZDA MOTOR CORPORATION, Hiroshima (JP)

(72) Inventors: Hironobu Sakashita, Hiroshima (JP); Kentaro Ota, Hiroshima (JP); Masahiro Nagoshi, Higashihiroshima (JP); Keisuke Tanaka, Higashihiroshima (JP); Shinichi Hikitani, Hiroshima (JP); Junki Yoshizako, Hiroshima (JP); Masanobu Koutoku, Higashihiroshima (JP); Toshinori Ueno, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/154,748

(22) Filed: Oct. 9, 2018

(65) Prior Publication Data

US 2019/0126741 A1 May 2, 2019

(30) Foreign Application Priority Data

Oct. 30, 2017 (JP) .................................. 2017-208960

(51) Int. Cl.
*B60K 11/08* (2006.01)
*B60K 11/06* (2006.01)
*B60K 13/04* (2006.01)

(52) U.S. Cl.
CPC ............ *B60K 11/085* (2013.01); *B60K 11/06* (2013.01); *B60K 13/04* (2013.01); *B60Y 2306/05* (2013.01); *F01N 2240/36* (2013.01); *F01N 2260/022* (2013.01); *F01N 2560/025* (2013.01)

(58) Field of Classification Search
CPC .............................. B60K 1/085; B60K 11/085
See application file for complete search history.

(56) References Cited

U.S. PATENT DOCUMENTS

| 2006/0095178 | A1* | 5/2006 | Guilfoyle | ............. | B60K 11/085 701/36 |
| 2011/0288717 | A1 | 11/2011 | Yu et al. | | |
| 2013/0146376 | A1 | 6/2013 | Nam et al. | | |
| 2016/0237884 | A1* | 8/2016 | Yamada | ................ | F02B 37/186 |

(Continued)

FOREIGN PATENT DOCUMENTS

| EP | 2 576 262 A1 | 4/2013 |
| EP | 2 805 842 A1 | 11/2014 |

(Continued)

*Primary Examiner* — Brian L Swenson
(74) *Attorney, Agent, or Firm* — Studebaker & Brackett PC

(57) ABSTRACT

A grille shutter control device of a vehicle includes an encapsulation structure covering an engine, a grille shutter provided at an opening formed at a front wall portion of the encapsulation structure, an actuator configured to move the grille shutter to open/close the opening, and a controller configured to control the actuator. The controller determines whether or not heat damage occurs on a related component relating to the engine upon key OFF, closes the grille shutter upon key OFF in the case of determining that the heat damage will not occur, and opens the grille shutter upon key OFF in the case of determining that the heat damage will occur.

6 Claims, 9 Drawing Sheets

(56) References Cited

U.S. PATENT DOCUMENTS

| | | | |
|---|---|---|---|
| 2016/0368366 A1 | 12/2016 | Miller et al. | |
| 2017/0120743 A1* | 5/2017 | Dudar | B60K 11/085 |
| 2018/0086198 A1* | 3/2018 | Maeda | B60K 11/06 |
| 2018/0312039 A1* | 11/2018 | Sakane | B60H 1/16 |
| 2018/0361846 A1 | 12/2018 | Dudar | |

FOREIGN PATENT DOCUMENTS

| | | |
|---|---|---|
| JP | S55-078718 U | 5/1980 |
| JP | S61-190433 U | 11/1986 |
| JP | 2013-119384 A | 6/2013 |
| JP | 2017-013638 A | 1/2017 |

\* cited by examiner

GRILLE SHUTTER CONTROL DEVICE OF VEHICLE

CROSS-REFERENCE TO RELATED APPLICATIONS

This application claims priority to Japanese Patent Application No. 2017-208960 filed on Oct. 30, 2017, the entire disclosure of which is incorporated by reference herein.

BACKGROUND

The technique disclosed herein relates to a grille shutter control device of a vehicle.

As described in Japanese Unexamined Patent Application Publication No. 2013-119384 or Japanese Unexamined Patent Application Publication No. 2017-013638 by way of example, a technique has been known, in which an engine is covered with an encapsulation member or a heat-retaining cover exhibiting heat insulating properties for the purpose of improving fuel consumption by quick warming upon re-start of the engine and a grille shutter is controlled to a closed state upon key OFF to retain heat in an engine room.

SUMMARY

However, depending on a driving state or traveling conditions, the temperature of an engine or an engine-related component such as an exhaust system component might increase during traveling. Upon key OFF after a vehicle has been stopped in a state in which the engine etc. whose temperatures have been increased maintain an extremely-high temperature, if a grille shutter is uniformly maintained in a closed state in a configuration in which the engine is covered with a heat-retaining cover etc. for improving warming performance upon re-start of the engine as described in the above-described documents, heat stays in an engine room or a tunnel portion for a long period of time. There is a concern that heat damage is on the engine-related component.

In the technique disclosed herein, heat can be retained in an engine room while heat damage on an engine-related component upon key OFF can be reduced.

The technique disclosed herein relates to a grille shutter control device of a vehicle. The device includes a grille shutter provided at an opening, an actuator configured to move the grille shutter to open/close the opening, and a controller configured to control the actuator.

The opening is formed at a front wall portion of an encapsulation structure exhibiting heat insulating properties and covering an engine.

The controller
  determines whether or not heat damage occurs on a related component relating to the engine upon key OFF,
  closes the grille shutter upon key OFF in the case of determining that the heat damage will not occur, and
  opens the grille shutter upon key OFF in the case of determining that the heat damage will occur.

According to the above-described configuration, heat can be retained in an engine room while the heat damage on an engine-related component upon key OFF can be reduced.

The encapsulation structure may include a tunnel cover arranged below an exhaust pipe below a floor tunnel.

The related component may include an electric drive type exhaust shutter valve provided at the exhaust pipe.

According to the above-described configuration, the heat damage on the exhaust shutter valve upon key OFF can be reduced.

A through-hole opening may be provided at a portion of the tunnel cover right below the exhaust shutter valve.

As viewed from the bottom, a clearance may be formed between a peripheral edge of the through-hole opening and the exhaust shutter valve.

According to the above-described configuration, even when the tunnel cover is provided below the exhaust pipe, the heat damage on the exhaust shutter valve due to radiant heat of the exhaust pipe through the tunnel cover can be reduced by the through-hole opening.

Further, the clearance is formed between the peripheral edge of the through-hole opening and the exhaust shutter valve as viewed from the bottom. Thus, in the case of determining that the heat damage will occur, the grille shutter is opened so that the flow of heat from the clearance to a grille opening (a shroud panel opening) can be promoted in the encapsulation structure such as the engine room to discharge the heat to the outside of the encapsulation structure through the grille opening. Thus, the heat damage on the related component can be reduced.

In the case of determining that the heat damage will occur, the controller may close the grille shutter after heat damage determination cancellation in which the heat damage determined for the related component is cancelled.

According to the above-described configuration, the grille shutter opened upon key OFF is closed at the timing of heat damage determination cancellation, and thereafter, heat can be retained in the engine and the related-component thereof.

The controller may
  determine occurrence of the heat damage upon key OFF based on a determined temperature of the related component while the vehicle is traveling,
  set an opening period of the grille shutter upon key OFF according to a determined degree of occurrence of the heat damage, and
  open the grille shutter for the opening period upon key OFF, and thereafter, close the grille shutter.

According to the above-described configuration, the grille shutter can be controlled only by timer control upon key OFF.

DETAILED DESCRIPTION

Hereinafter, an embodiment will be described in detail with reference to the drawings.

Figure 1:
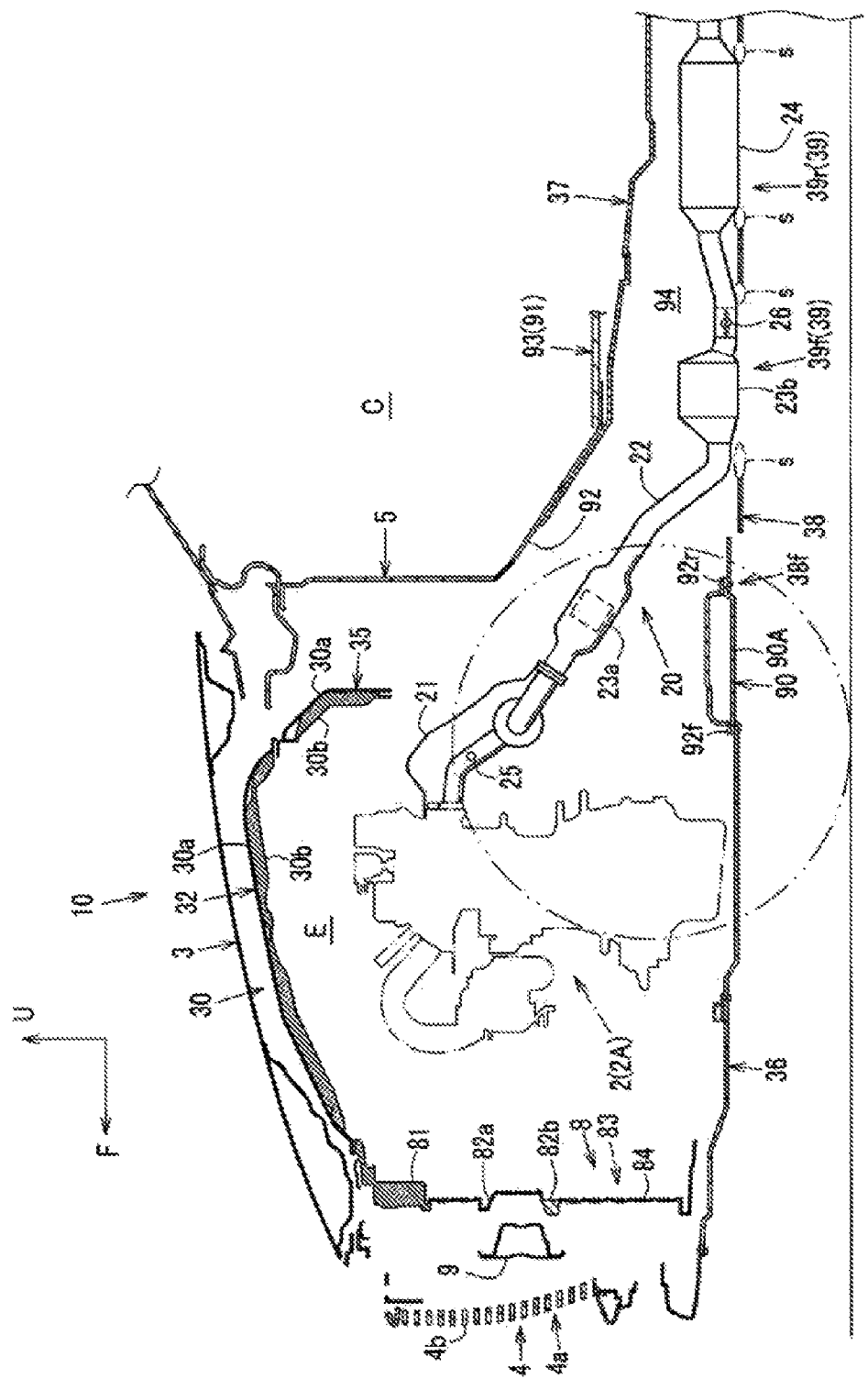
FIG. 1 is a center longitudinal sectional view in a vehicle width direction, the view illustrating a main portion of a vehicle front portion provided with a grille shutter control device.
Figure 2:
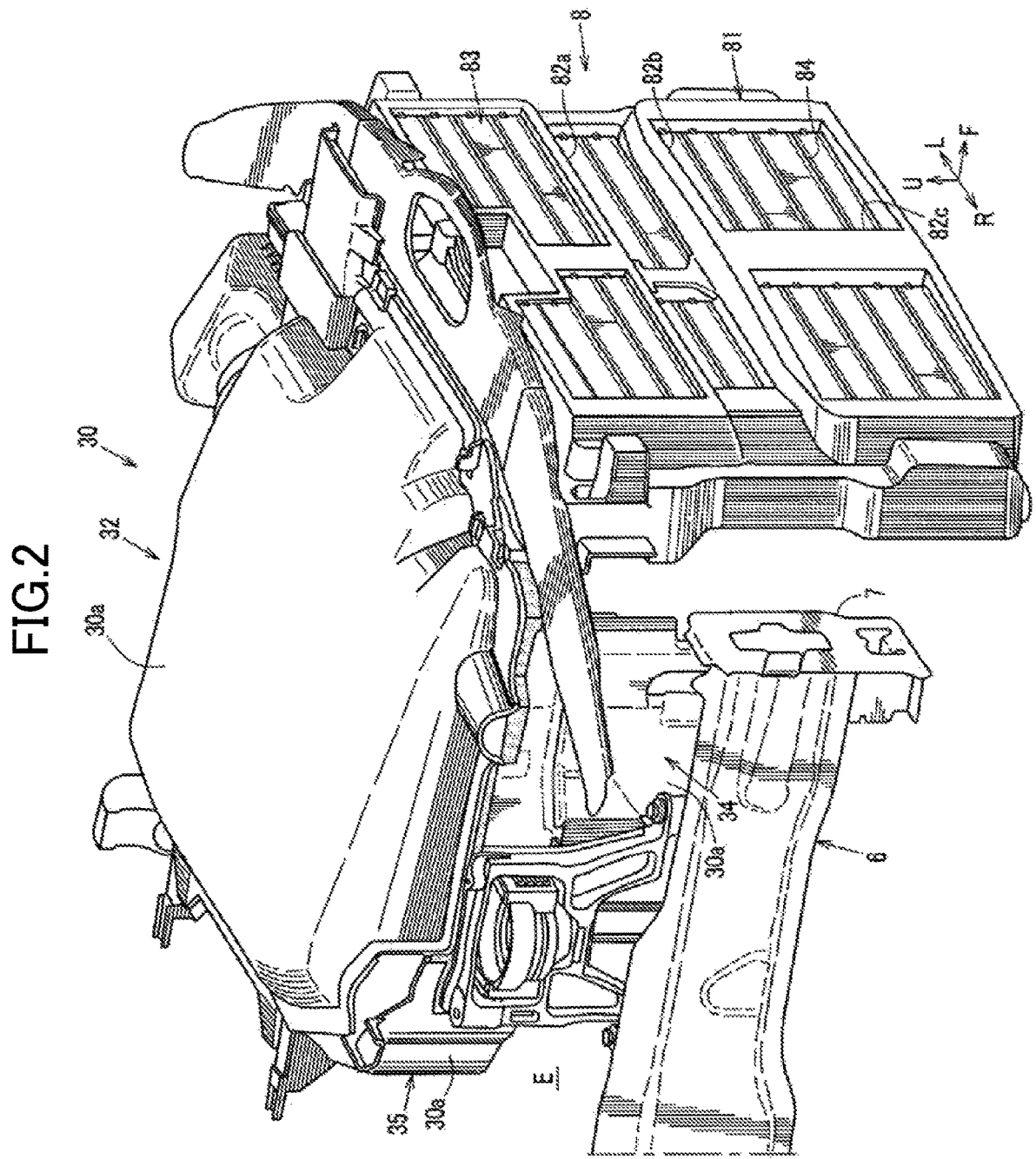
FIG. 2 is a perspective view of an encapsulation structure of an engine diagonally from an upper front right side.
Figure 3:
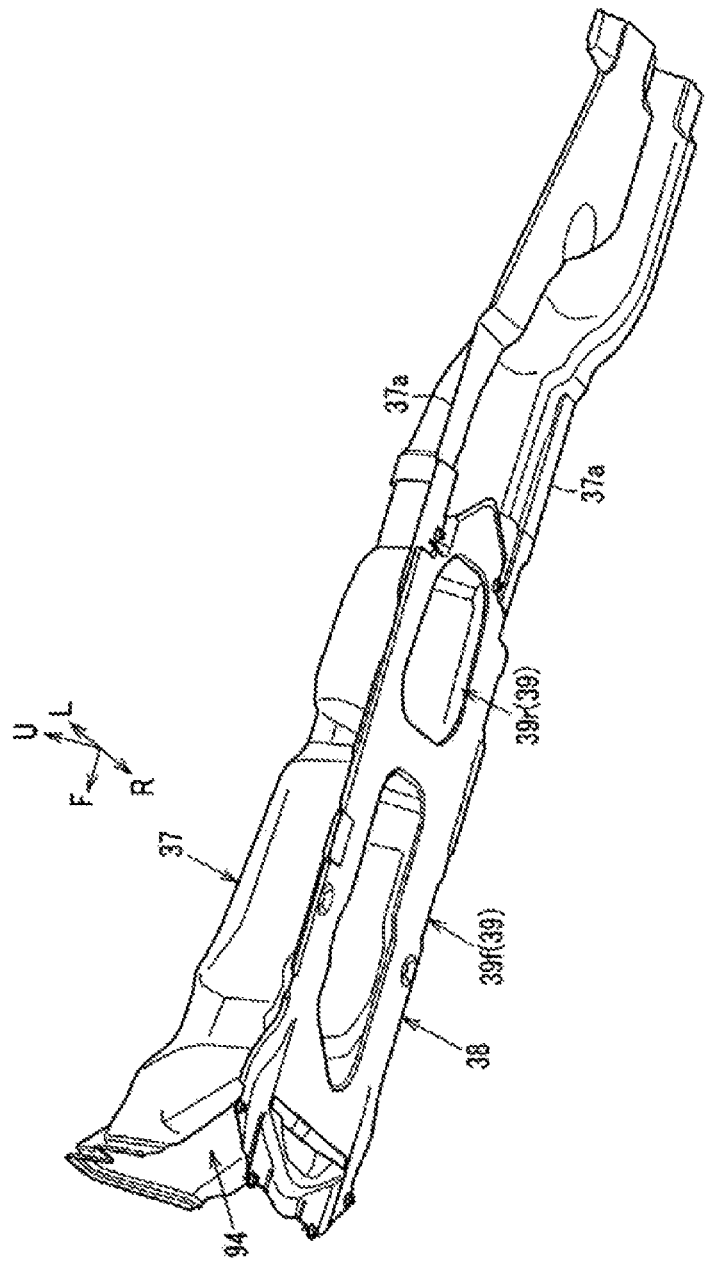
FIG. 3 is a perspective view of a tunnel insulator and a tunnel cover diagonally from a lower front left side.

As illustrated in FIGS. 1 to 3, a vehicle body structure will be first described prior to description of a grille shutter control device 10 of a vehicle of the present embodiment. Note that in the figures, an arrow F indicates a vehicle front side, an arrow L indicates a vehicle left side, an arrow R indicates a vehicle right side, and an arrow U indicates a vehicle upper side.

As illustrated in FIG. 1, an engine room E in which an engine 2 is arranged at a front portion of the vehicle and a compartment C formed at the rear of the engine room E are provided.

The engine room E is configured such that an upper portion thereof is partitioned by a bonnet 3 extending downward to the front in a vehicle front-to-rear direction, a front portion thereof is partitioned by a front bumper face 4 (hereinafter referred to as a "bumper face 4" for short) positioned along an upper-to-lower direction, and a rear portion thereof is partitioned by a dash panel 5 extending in the upper-to-lower direction.

As illustrated in FIG. 2, a pair of right and left front side frames 6 (only the right side is illustrated) extending forward of the vehicle from a lower portion of the dash panel 5 is provided on both of the right and left sides of the engine room E. A crash can attachment set plate 7 is provided at a front end portion of each front side frame 6.

Moreover, as illustrated in FIG. 1, front openings 4a for taking traveling wind (fresh air) into the engine room E are formed at a center portion of a front surface of the bumper face 4 in a vehicle width direction. The front openings 4a are covered with a front grille 4b, the front grille 4b being formed in a porous form so that the traveling wind can pass through the front grille 4b.

A bumper beam 9 for supporting a later-described shroud panel 81 (see FIGS. 1 and 2) is arranged at the rear of the bumper face 4. The bumper beam 9 extends in the vehicle width direction, and at rear surfaces of both end portions, is coupled to the front end portions of the right and left front side frames 6 extending in the front-to-rear direction through not-shown crash cans as coupling members.

Moreover, as illustrated in FIG. 1, a suspension cross member 90 for coupling right and left suspensions (not shown) for front wheels is arranged at a lower rear portion of the engine room E. The suspension cross member 90 forms a closed sectional portion 90A extending in the vehicle width direction.

As illustrated in this figure, the dash panel 5 includes a panel body extending in the upper-to-lower direction and the vehicle width direction to separate the engine room E and the compartment C, and at the center in the vehicle width direction, is provided with a tunnel opening 92 connected to a tunnel portion 91.

As illustrated in this figure, a floor panel 93 extends backward from a lower rear end of the dash panel 5, and forms a floor surface of the compartment C extending in the vehicle front-to-rear direction and the vehicle width direction. The tunnel portion 91 projecting upward (inward of the compartment C) in a substantially hat shape is formed at the center of the floor panel 93 in the vehicle width direction.

The tunnel portion 91 extends in the vehicle front-to-rear direction along an exhaust system 20 arranged to extend in the front-to-rear direction at the rear of the engine room E.

As illustrated in FIG. 1, the exhaust system 20 mainly includes exhaust system components such as an exhaust manifold 21 forming an exhaust side of the engine 2, two catalytic converters 23a, 23b for exhaust gas purification, a pre-silencer 24, and an exhaust pipe 22 connected among these components 21, 23a, 23b, 24. The exhaust system 20 is housed in a recessed space (hereinafter referred to as the "inside of the tunnel portion 91") of the tunnel portion 91. Note that the two catalytic converters 23a, 23b include a first catalytic converter 23a on an upstream side and a second catalytic converter 23b on a downstream side in an exhaust path.

Further, an $O_2$ sensor 25 configured to detect an oxygen concentration in exhaust gas is provided at the exhaust manifold 21 or in the vicinity of a downstream side of the exhaust manifold 21.

An exhaust shutter valve 26 configured to narrow the exhaust path in the exhaust pipe 22 is provided between the second catalytic converter 23b and the pre-silencer 24. The exhaust shutter valve 26 employs such an electric drive technique that opening/closing of the exhaust shutter valve 26 is controlled by a not-shown actuator according to, e.g., an operation state of the engine 2.

As illustrated in FIGS. 1 and 2, the above-described vehicle body structure has an encapsulation structure 30 covering the engine 2 (in a precise sense, the engine 2 and a power train 2A combined with a transmission) and associated components of the engine 2 such as the exhaust system components.

The encapsulation structure 30 includes, at the engine room E, engine heat-retaining wall portions (81, 32 to 36) covering the outer periphery of the engine 2. As illustrated in FIGS. 1 and 2, the engine heat-retaining wall portions include the front wall portion 81, an upper wall portion 32, a left wall portion (not shown), a right wall portion 34 (see FIG. 2), a rear wall portion 35, and a lower wall portion 36 (see FIG. 1) each covering the front, upper, left, right, rear, and lower sides of the engine 2.

Of these wall portions, the upper wall portion 32, the left wall portion (not shown), the right wall portion 34, the rear wall portion 35, and the lower wall portion 36 are, as illustrated in this figure, configured together such that a synthetic resin cover 30a and a heat-retaining material 30b (see FIG. 1) made of a glass wool material or an urethane material exhibiting heat retaining properties (heat insulating properties) overlap with each other.

As illustrated in FIGS. 1 and 2, a shroud 8 configured to hold, e.g., a not-shown radiator and a not-shown condenser as heat exchangers with the radiator and the condenser being covered from the front is arranged at the front of the engine 2.

The shroud 8 includes the rectangular frame-shaped shroud panel 81, and multiple openings 83 penetrating in the front-to-rear direction and partitioned in the upper-to-lower direction and the vehicle width direction by multiple cross stays 82a, 82b extending in the vehicle width direction and a center stay 82c extending in the upper-to-lower direction at the center in the vehicle width direction are provided inside the shroud panel 81 as viewed from the front.

Multiple grille shutters 84 extending in the vehicle width direction are pivotally supported on the shroud panel 81, and a grille shutter actuator 18 (hereinafter referred to as an "actuator 18" for short) (see FIG. 4) configured to swing the grille shutters 84 so that the openings 83 can be opened/closed by the grille shutters 84 is provided.

With this configuration, the shroud 8 injects the traveling wind into the engine room E (particularly, the not-shown radiator) through the openings 83, and adjusts the amount of wind injected into the engine room E by opening/closing of the grille shutters 84.

Although not shown in the figure, a grille shutter position sensor 17 (see FIG. 4) is provided at a rotary shaft of the actuator 18. The grille shutter position sensor 17 is configured to detect a fully-open state or a fully-closed state of the grille shutters 84 according to the position of the rotary shaft particularly upon ignition OFF (IG-OFF, i.e., key OFF), thereby outputting a detection signal to a later-described ECU 11.

Note that in this example, the grille shutter position sensor 17 is employed as a unit configured to detect opening/closing of the grille shutters 84, but a shutter opening degree sensor (not shown) configured to detect the angle of a rotary shaft of the grille shutter 84 as the opening degree of the grille shutter 84 may be provided to output a detection signal to the ECU 11.

The shroud panel 81 screens, in the closed state of the grille shutters 84, the engine room E such that hot air is not released to the outside of the vehicle from the front of the engine room E through the openings 83, and therefore, retains heat. Thus, the shroud panel 81 including the grille shutters 84 is formed as the front wall portion 81 covering the front of the engine 2.

Moreover, as illustrated in FIG. 1, the engine undercover 36 covering the engine 2 from below is arranged below the engine room E. The engine undercover 36 is, at a front end thereof, attached and fixed to a lower end of the bumper face 4 with a fastening member such as a bolt or a nut. Similarly, the engine undercover 36 is, at a rear end thereof, attached and fixed to a flange portion 92$f$ with a fastening member, the flange portion 92$f$ protruding forward from a front end of the closed sectional portion 90A of the suspension cross member 90. The engine undercover 36 covers the engine 2 from below, and therefore, forms the lower wall portion 36.

Moreover, as illustrated in FIGS. 1 and 3, a tunnel insulator 37 exhibiting heat resistance is arranged below the tunnel portion 91. The tunnel insulator 37 is formed in a substantially hat shape projecting upward (inward of the compartment C) along a lower surface (an inner peripheral surface) of the tunnel portion 91 covering the exhaust system 20 from above.

Further, a tunnel cover 38 exhibiting heat resistance and covering the inside of the tunnel portion 91 from below is arranged at a front portion of the tunnel portion 91. As illustrated in FIG. 1, a front end of the tunnel cover 38 is, with a fastening member such as a bolt or a nut, attached and fixed to a flange portion 92$r$ protruding backward from a rear end of the closed sectional portion 90A of the suspension cross member 90.

As illustrated in FIG. 1, the tunnel cover 38 is arranged at the substantially same height as or at a position slightly lower than each lower portion of the second catalytic converter 23$b$ and the pre-silencer 24. Further, the lower surfaces of the engine undercover 36, the suspension cross member 90, and the tunnel cover 38 form a substantially continuous flat surface.

Further, lower portions of the floor panel 93 positioned at the right and left of the tunnel portion 91 are covered with a pair of right and left floor undercovers 40 from below (see FIG. 8). The tunnel cover 38 and the pair of right and left floor undercovers 40 are arranged such that the lower surfaces thereof are substantially flush with each other, and therefore, aerodynamic performance under the floor of the vehicle during traveling is enhanced (see arrows w2 in FIGS. 7 and 8).

As illustrated in FIG. 1, the tunnel insulator 37 and the tunnel cover 38 screen, in the closed state of the grille shutters 84, a space 94 (hereinafter referred to as a "tunnel underspace 94") between these components 37, 38 from the outside of the vehicle such that hot air from the exhaust system components (21 to 24) is not released to the outside of the vehicle, and retain heat. The tunnel insulator 37 and the tunnel cover 38 together form part of the above-described encapsulation structure 30.

That is, the tunnel underspace 94 corresponding to the inside of the tunnel portion 91 communicates with the engine room E in the front-to-rear direction, and the engine room E and the tunnel underspace 94 are covered with the encapsulation structure 30 (see FIG. 1).

Figure 8:
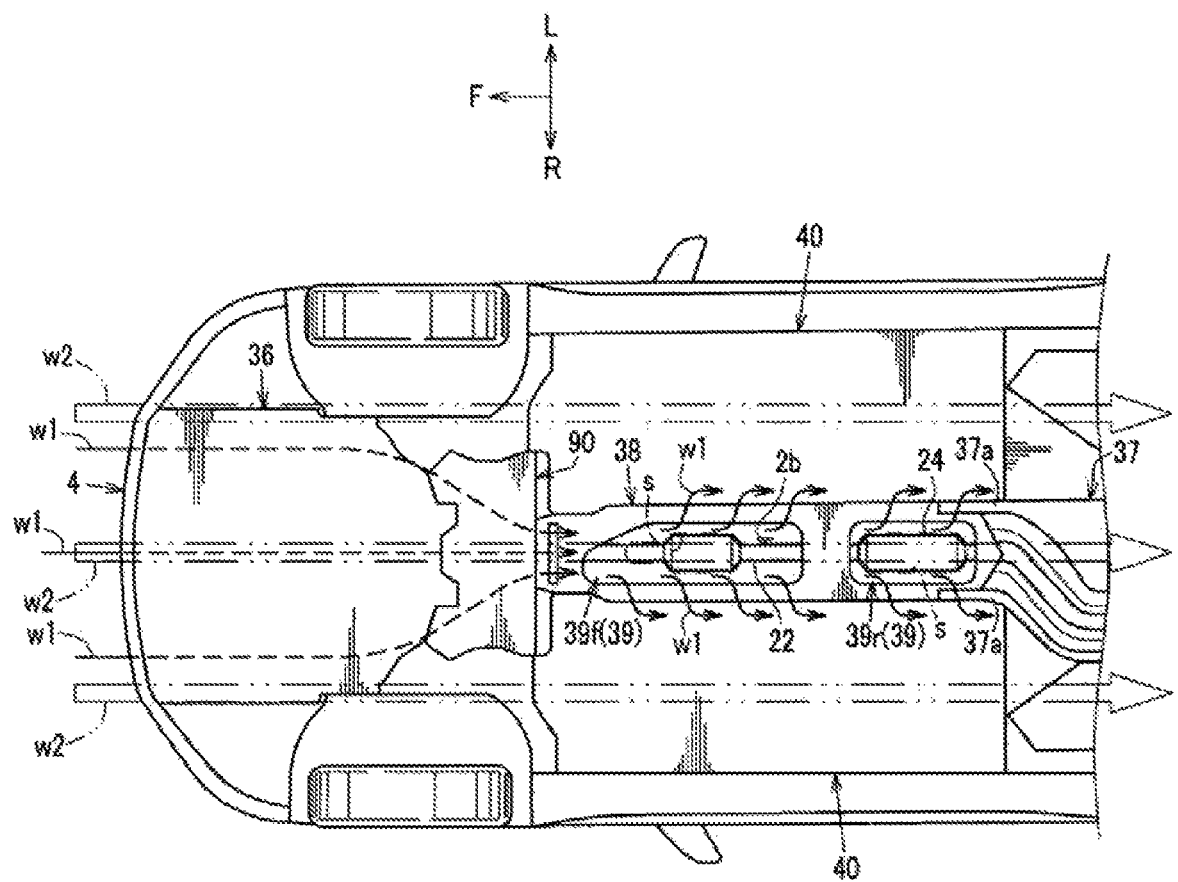
FIG. 8 is a schematic view for describing action of the flow of traveling wind in the grille shutter opening state while the vehicle is traveling as viewed from the bottom of the vehicle.

As illustrated in FIGS. 1, 3, and 8, through-hole openings 39 (39$f$, 39$r$) penetrating in the upper-to-lower direction are formed at at least portions of the tunnel cover 38 corresponding to the second catalytic converter 23$b$ and the pre-silencer 24 of the exhaust system 20 and portions of the tunnel cover 38 corresponding to outer peripheral portions of the second catalytic converter 23$b$ and the pre-silencer 24 as viewed from the bottom.

In this example, a front through-hole opening 39$f$ and a rear through-hole opening 39$r$ at the rear of the front through-hole opening 39$f$ are formed as the through-hole openings 39 at the tunnel cover 38.

With the through-hole openings 39 at the tunnel cover 38, even when the tunnel cover 38 is provided below the exhaust system 20, these components 20, 38 are not close to each other. This reduces heat damage on the exhaust shutter valve 26 due to radiant heat of the exhaust system components (the second catalytic converter 23$b$, the pre-silencer 24, and the exhaust pipe 22 between these components 23$b$, 24) through the tunnel cover 38.

Further, the front through-hole opening 39$f$ is continuously formed in the front-to-rear direction, including at least a portion right below the second catalytic converter 23$b$ and a portion right below the exhaust pipe 22 including the exhaust shutter valve 26. As viewed from the bottom, a clearance s is formed between a peripheral edge of the front through-hole opening 39$f$ and the exhaust pipe 22 including the second catalytic converter 23$b$ and the exhaust shutter valve 26 (see FIGS. 1 and 8).

The rear through-hole opening 39$r$ is formed at at least a portion right below the pre-silencer 24. As viewed from the bottom, a clearance s is formed between a peripheral edge of the rear through-hole opening 39$r$ and the pre-silencer 24 (see the above-described figures).

Figure 9:
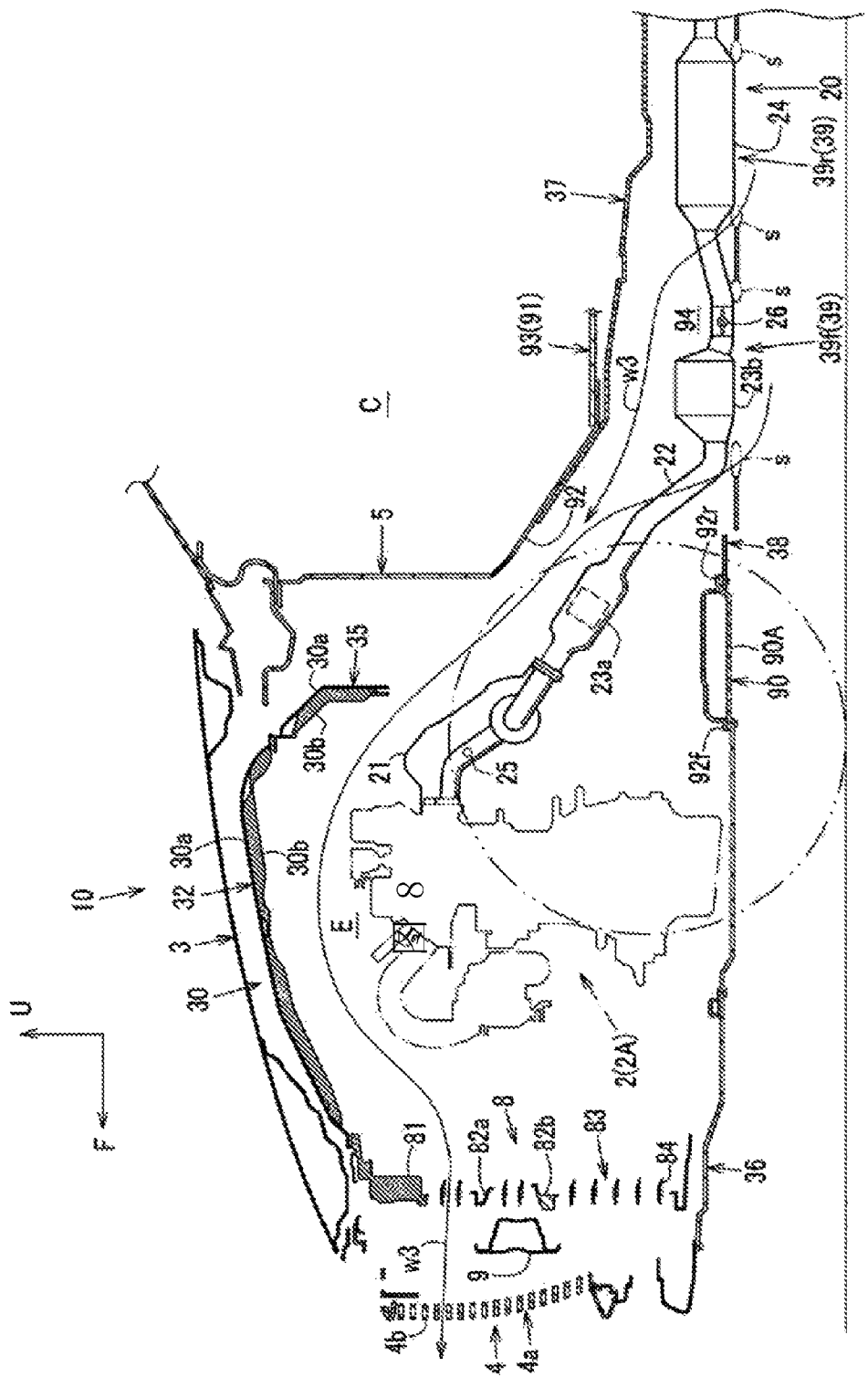
FIG. 9 is a schematic view for describing action of the flow of hot air in an engine room and a tunnel portion in the grille shutter opening state upon IG-OFF in the view corresponding to FIG. 1.

When the vehicle is stopped, opening of the grille shutters 84 might lead to outflow of hot air of the tunnel underspace 94 and the engine room E to the outside of the vehicle through the openings 83 of the shroud 8. In this state, the front through-hole opening 39$f$ and the rear through-hole opening 39$r$ are, as described above, formed with the clearances s (slits) from the exhaust system components positioned above as viewed from the bottom, and therefore, external air is injected into the tunnel underspace 94 through the clearances s. Accordingly, as illustrated in FIG. 9, the hot air w3 flows from the tunnel underspace 94 to the engine room E, and discharging of the hot air w3 to the outside of the vehicle through the openings 83 of the shroud 8 is promoted (see an arrow w3 in FIG. 9).

Figure 4:
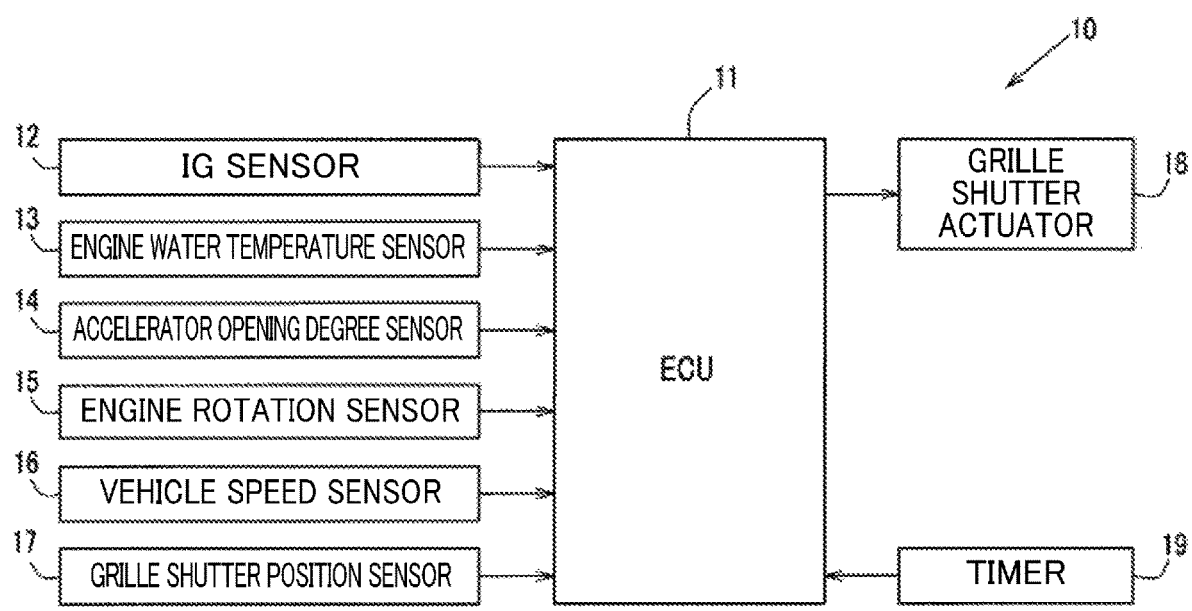
FIG. 4 is a block diagram of an electric configuration of the grille shutter control device of a vehicle.

As illustrated in FIG. 4, the grille shutter control device 10 configured to control opening/closing of the grille shutters 84 forming part of the above-described encapsulation structure 30, i.e., part of the shroud panel 81 as the front wall portion 81, is provided at the vehicle of the present embodiment.

The grille shutter control device 10 includes the ECU 11 as a grille shutter opening/closing controller provided at an automobile or a power plant thereof.

The ECU 11 includes a central processing unit (CPU) configured to execute processing such as arithmetic operation according to a program, a memory having a RAM and a ROM and configured to store a program and data, and an input/output bus (an I/O bus) as an input/output path for an electrical signal for the CPU.

Detection signals from an IG sensor 12, an engine water temperature sensor 13, an accelerator opening degree sensor 14, an engine rotation sensor 15, a vehicle speed sensor 16, the grille shutter position sensor 17, etc. are input to the ECU 11. The ECU 11 outputs, based on these detection signals, a control signal to the actuator 18 for the grille shutters 84. Moreover, the ECU 11 includes, for example, a count-up timer 19 configured to output an elapsed time from predetermined trigger input such as IG-OFF detection by the IG sensor 12, and the elapsed time can be reset to zero after the later-described processing of opening/closing the grille shutters 84.

The IG sensor 12 is configured to sense operation for an ignition switch (IG SW) as an IG mechanism.

The engine water temperature sensor 13 is provided facing a water jacket (not shown) formed on a side wall of the engine 2, and is configured to detect the temperature (an engine water temperature) of coolant water flowing in the water jacket. The accelerator opening degree sensor 14 is configured to detect the amount (an accelerator opening degree) of stepping on an accelerator pedal (not shown) by a driver. The engine rotation sensor 15 is configured to detect, as the rotating speed (an engine speed) of the engine 2, a pulse signal generated according to rotation of a crank shaft. The vehicle speed sensor 16 is configured to detect a vehicle traveling speed (a vehicle speed).

With this configuration, the ECU 11 executes, from at least one of the input signals from each sensor regarding to the engine water temperature, the vehicle speed, the accelerator opening degree, and the engine speed, determination (hereinafter also referred to as "heat damage occurrence determination") on whether or not heat damage is on a component (hereinafter referred to as an "engine-related component") relating to the engine 2. In the case of determining that the heat damage will not occur, the grille shutters 84 are closed. On the other hand, in the case of determining that the heat damage will occur, the control of opening the grille shutters 84 is performed.

Although not specifically shown in the figure, the $O_2$ sensor 25 of the engine-related components includes, for example, a harness bundling various electric wires for power supply and for signal lines and a case at least partially made of rubber or resin. Moreover, the exhaust shutter valve 26 is of the electric drive type driven by the actuator, and a body portion is directly attached to surfaces of the exhaust system components. Thus, the exhaust shutter valve 26 is susceptible to heat damage due to heat generated from the surfaces of the exhaust system components. For these reasons, in this example, the $O_2$ sensor 25 and the exhaust shutter valve 26 are, for example, identified as heat damage target components, and the control of opening/closing the grille shutters 84 is performed such that no heat damage on these heat damage target components occurs.

Further, in this example, a threshold temperature lower than a heatproof temperature as an upper limit at which no heat damage occurs is set for each heat damage target component, considering a margin for the heatproof temperature. This threshold temperature is, as a control amount, stored in advance in the memory provided at the ECU 11. For example, in a case where the heatproof temperature is 130 degrees, the threshold temperature is set to 110 degrees and stored in the memory.

The applicant of the present application has focused on a fact that the temperature (i.e., the surface temperature or surrounding temperature of the heat damage target component) of the heat damage target component upon IG-ON greatly depends on the amount of heat generation of the engine 2 (the degree of load of the engine 2) and cooling performance of the engine 2 and the related components thereof. In the present embodiment, the ECU 11 indirectly determines the temperature of the heat damage target component based on the engine water temperature, the accelerator opening degree, and the engine speed indicating the amount of heat generation of the engine 2 and the vehicle speed indicating the cooling performance of the engine 2 etc. among the control amount (an input factor) obtained by the input signal from each sensor.

Specifically, the amount of heat generation of the engine 2 can be mainly grasped based on the engine water temperature. However, in this example, the accelerator opening degree and the engine speed easily respondable according to an actual driving state, traveling conditions, etc. are further taken to more precisely grasp the amount of heat generation of the engine 2, for example. That is, the ECU 11 of this example acquires, as described above, the engine water temperature, the accelerator opening degree, and the engine speed as the control amounts for determining the amount of heat generation of the engine 2.

Meanwhile, the engine 2 and the engine-related components such as the radiator are cooled by the traveling wind injected into the engine room E through the openings 83 provided at the shroud panel 81 while the vehicle is traveling. This traveling wind changes according to the vehicle speed. Thus, when the grille shutter position sensor 17 senses that the grille shutters 84 are in the open state, the ECU 11 of this example acquires, as described above, the vehicle speed as the control amount for determining the cooling performance of the engine 2 and the engine-related components such as the radiator.

In heat damage occurrence determination, the ECU 11 obtains a determined temperature (hereinafter referred to as a "determined heat damage target component temperature") of the heat damage target component using, e.g., a map of a correlation between each value of the engine water temperature, the accelerator opening degree, the engine speed, and the vehicle speed input from each sensor and the heat damage target component temperature. The map can be formed, in advance, by an experiment, for example.

In a case where the determined heat damage target component temperature is higher than the above-described threshold temperature, it is determined for each heat damage target component that the heat damage will occur. On the other hand, in a case where the determined heat damage target component temperature is lower than the threshold temperature, it is determined that the heat damage will not occur.

The vehicle of the present embodiment described herein employs such a configuration that the engine 2 and the exhaust system 20 are, as described above, covered with the encapsulation structure 30 exhibiting the heat retaining properties to retain heat in the engine room E and the tunnel underspace 94 during stop of the vehicle for the purpose of improving fuel consumption by quick warming upon subsequent start-up of the engine 2.

However, in the case of employing the configuration of covering the engine 2 and the exhaust system 20 with the encapsulation structure 30, when the vehicle is stopped from a traveling state with the engine 2 etc. being in an extremely-high temperature state, heat might stay in the encapsulation structure 30 for a long period of time. For this reason, there is a concern that the heat damage is on the engine-related components.

For this reason, the ECU 11 of this example determines, during traveling, not only occurrence of the heat damage which might occur during IG-ON (during operation of the engine 2) but also occurrence of the heat damage which might occur upon IG-OFF.

For example, during traveling, the map data indicating the correlation between the control amount input from each sensor and the heat damage target component temperature upon IG-OFF can be, as described above, used for the determined heat damage target component temperature upon IG-OFF.

Further, in a case where it is determined that the heat damage will occur on the heat damage target component upon IG-OFF, the ECU 11 also determines, during traveling, a timer time To until it is determined (hereinafter referred to as "heat damage determination cancellation") that heat damage determination is cancelled after IG-OFF, i.e., a timer time To until the temperature of the heat damage target component reaches lower than the threshold temperature, for the heat damage target component.

In this case, the increased temperature of the heat damage target component during traveling is, needless to say, decreased over time after IG-OFF (stop of the engine 2). Thus, in a case where it is determined for the heat damage target component during traveling that the heat damage will occur, the ECU 11 determines a timer time To until heat damage determination cancellation after IG-OFF using, e.g., a map of a relationship between the heat damage target component temperature and time after IG-OFF. For example, the map can be formed, in advance, by checking a state of a change in the heat damage target component temperature from IG-OFF.

In a case where it is determined for the heat damage target component during traveling that the heat damage will not occur upon IG-OFF, the ECU 11 closes, as described above, the grille shutters 84 upon IG-OFF for ensuring the heat retaining properties inside the encapsulation structure 30. On the other hand, in a case where it is determined during traveling that the heat damage will occur upon IG-OFF, the ECU 11 performs the control of opening the grille shutters 84 upon IG-OFF for avoiding the heat damage on the heat damage target component.

In this state, the ECU 11 opens/closes the grille shutters 84 after IG-OFF based on a result of heat damage occurrence determination performed during IG-ON right before IG-OFF.

As described above, heat damage occurrence determination for the engine-related components after stop of the vehicle is sequentially performed during IG-ON, and therefore, power does not need to be continuously supplied for performing heat damage occurrence determination for the ECU 11 and various sensors after IG-OFF. Only the minimum function such as the timer 19 is continuously operated so that the heat damage on the heat damage target component after IG-OFF (during stop of the vehicle) can be avoided whenever the vehicle is stopped from the traveling state.

Hereinafter, the flow of the control of opening/closing the grille shutters 84 by the ECU 11 will be described with reference to flowcharts of FIGS. 5 and 6.

Figure 5:
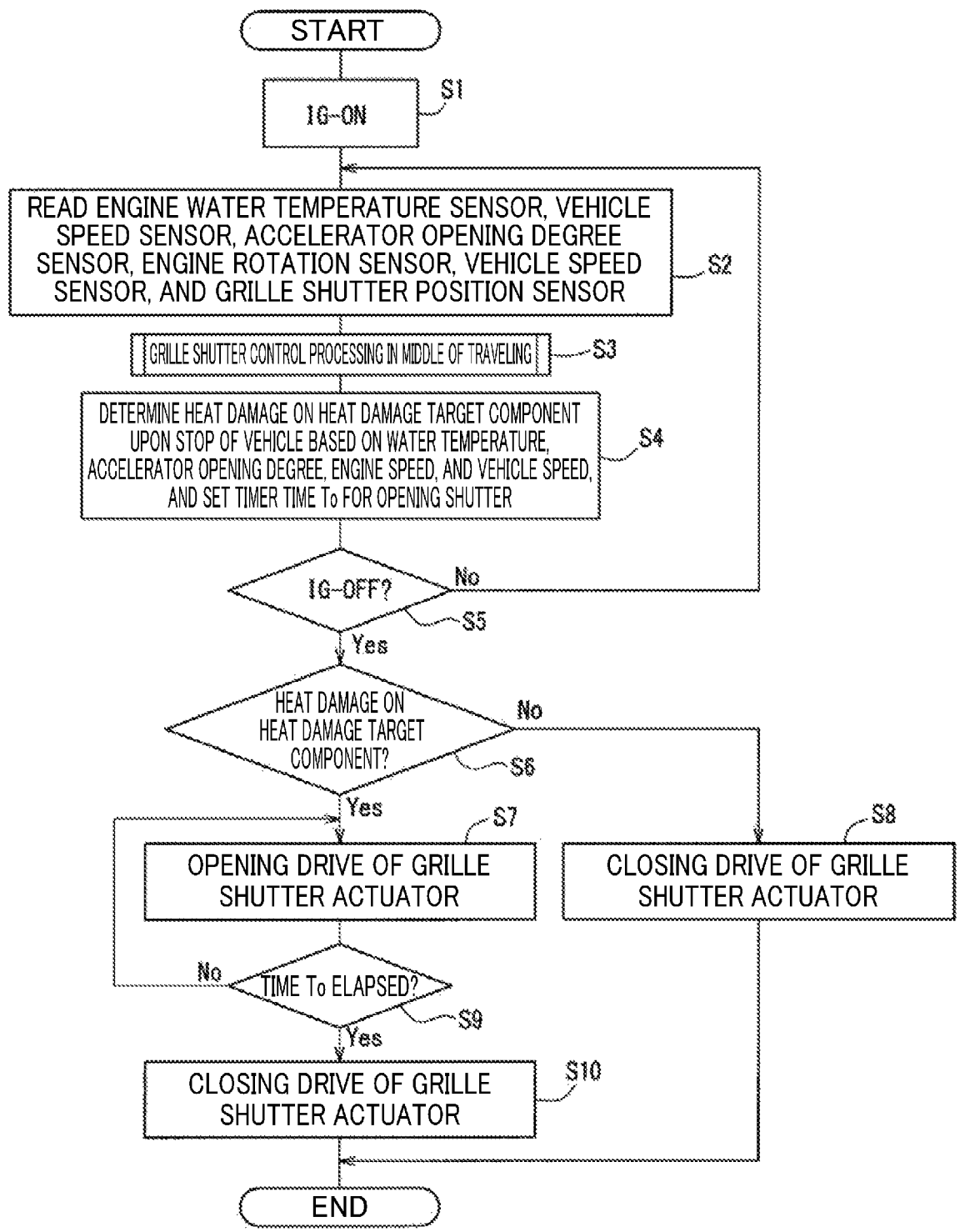
FIG. 5 is a flowchart of grille shutter opening/closing control.
Figure 6:
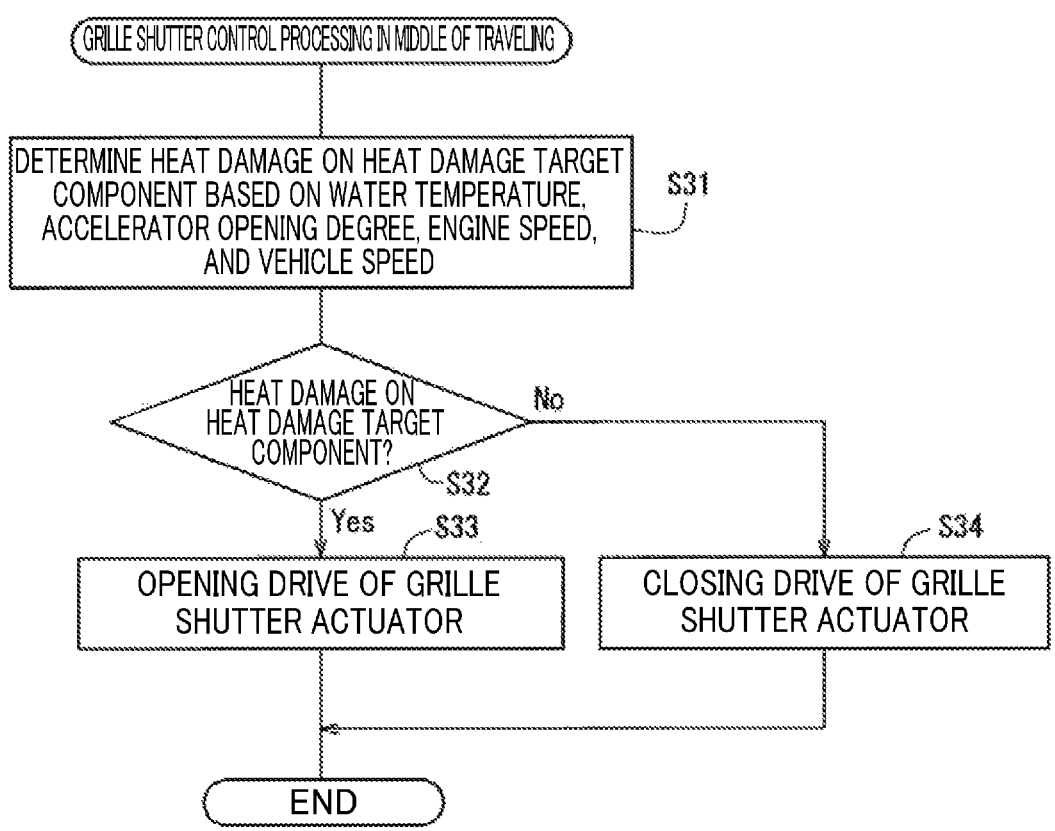
FIG. 6 is a flowchart of grille shutter control processing in the middle of traveling in FIG. 5.

First, as illustrated in FIGS. 4 and 5, when the IG sensor 12 senses that the engine 2 is started by ignition ON (IG-ON) by, e.g., key operation of the driver (a step S1), the ECU 11 performs, for determining a heat generation state of the engine 2, the processing of reading each electric signal of the engine water temperature from the engine water temperature sensor 13, the accelerator opening degree from the accelerator opening degree sensor, the engine speed from the engine rotation sensor 15, and the vehicle speed from the vehicle speed sensor 16 (a step S2). Note that the grille shutters 84 are closed upon IG-ON in preference to improvement of the aerodynamic performance.

Then, while the vehicle is traveling, the ECU 11 performs grille shutter opening/closing control processing in the middle of traveling (a step S3).

The grille shutter opening/closing control processing in the middle of traveling will be briefly described with reference to the flowchart of FIG. 6. The ECU 11 determines the heat damage on the heat damage target component based on the engine water temperature, the accelerator opening degree, the engine speed, and the vehicle speed read in real time by various sensors described above (a step S31).

Figure 7:
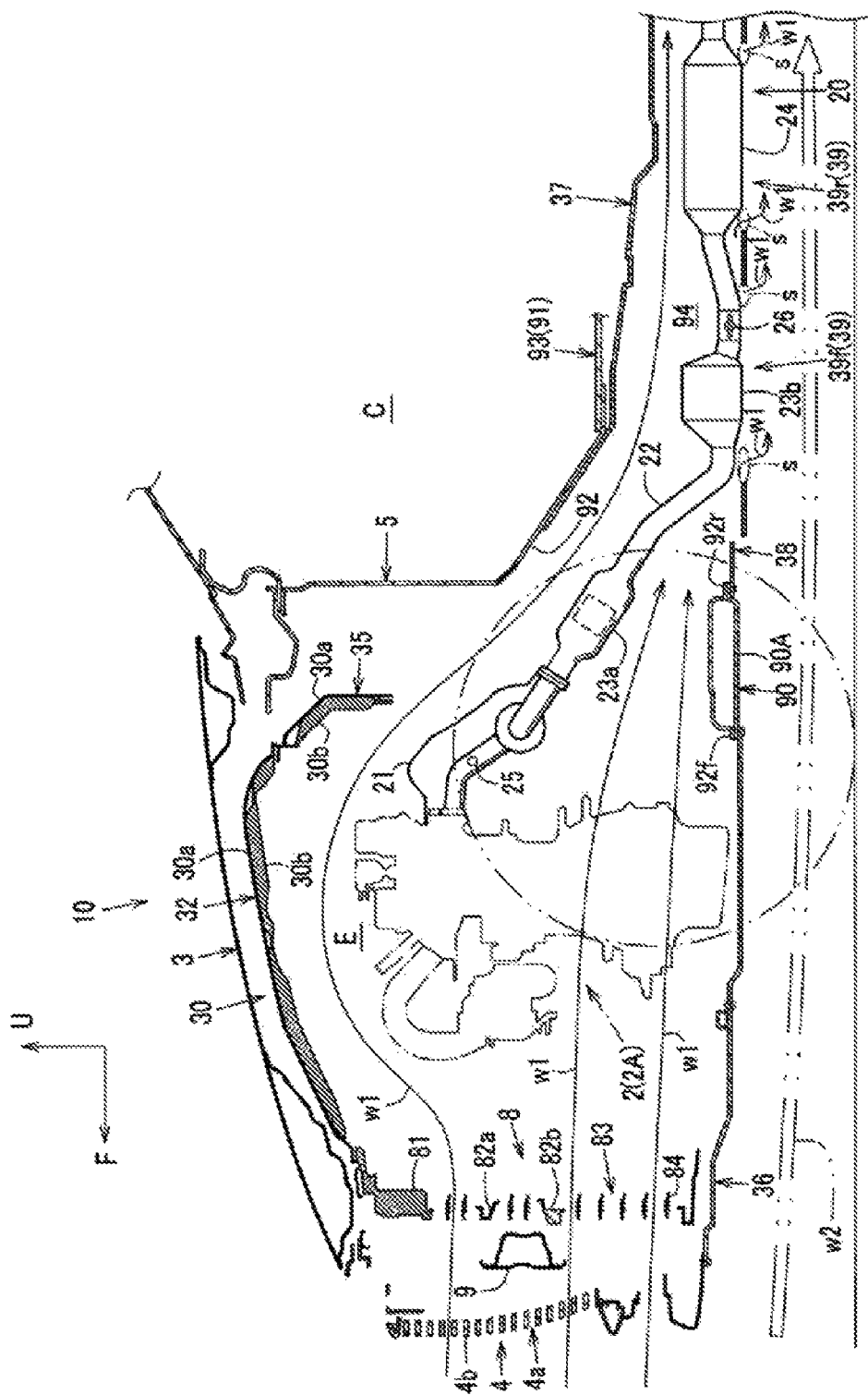
FIG. 7 is a schematic view for describing action of the flow of traveling wind in a grille shutter opening state while the vehicle is traveling in a view corresponding to FIG. 1.

In a case where the ECU 11 determines for the heat damage target component that the heat damage will occur (a step S32: Yes), the ECU 11 drives the actuator 18 (see FIG. 4) to open the grille shutters 84 (a step S33). In this manner, as illustrated in FIGS. 7 and 8, traveling wind w1 is actively injected into the engine room E (particularly, the radiator) through the openings 83, and hot air of the tunnel underspace 94 is discharged to the outside of the vehicle from the engine room E through the through-hole openings 39 (the front through-hole opening 39*f* and the rear through-hole opening 39*r*). Thus, the temperatures of the engine 2 and the engine-related components can be decreased to prevent the heat damage (see an arrow w1 in FIGS. 7 and 8).

On the other hand, in a case where the ECU 11 determines for the heat damage target component that the heat damage will not occur (the step S32: No), the ECU 11 maintains the grille shutters 84 in the closed state (a step S34). With this configuration, injection of the traveling wind into the engine room E can be prevented, and excellent aerodynamic performance can be held during traveling.

After the above-described grille shutter opening/closing control processing in the middle of traveling (the step S3), the process returns to FIG. 5, and then processing of a step S4 is executed.

Specifically, the ECU 11 executes, during traveling, the heat damage occurrence determination processing for the heat damage target component upon IG-OFF based on the engine water temperature, the accelerator opening degree, the engine speed, and the vehicle speed read from various sensors described above. In addition, in the case of determining that the heat damage will occur, the ECU 11 sets the timer time To for maintaining the grille shutters 84 in the open state (the step S4).

The above-described processing of the steps S2 to S4 is repeated until IG-OFF (a step S5: No), and the heat damage occurrence determination result and the timer time To are sequentially updated to the latest values. Not only during traveling but also upon IG-OFF by stopping of the traveling vehicle, the heat damage on the heat damage target components after IG-OFF can be avoided.

Upon IG-OFF after the traveling vehicle has been stopped (the step S5: Yes), the ECU 11 maintains the minimum equipment such as the actuator 18 for the grille shutters 84 and the count-up timer 19 in an energization state for a not-shown battery. Then, in a case where it is determined that the heat damage will occur on at least one of multiple heat damage target components such as the $O_2$ sensor 25 and the exhaust shutter valve 26 upon IG-OFF in the processing of the step S4 right before IG-OFF (a step S6: Yes), when the grille shutters 84 are in the closed state upon IG-OFF, the ECU 11 drives the actuator 18 to bring the grille shutters 84 into the open state (a step S7). Note that in a case where the grille shutters 84 are in the open state upon IG-OFF, the ECU 11 maintains such an open state.

Further, when IG-OFF is detected (the step S5: Yes), the ECU 11 starts the timer 19 to maintain, based on the input signal from the timer 19, the open state of the grille shutters 84 until the timer time To is elapsed (a step S9: No).

Then, when the timer time To set at the step S9 is elapsed (the step S9: Yes), the ECU 11 drives the actuator 18 to bring the grille shutters 84 into the closed state to retain heat in the engine room E and the tunnel underspace 94 (a step S10). Then, the grille shutter opening/closing control processing ends.

Note that at the step S6 in FIG. 5, in a case where it is determined for each of the multiple heat damage target components 25, 26 such as the $O_2$ sensor 25 and the exhaust shutter valve 26 that the heat damage will occur upon IG-OFF (the step S6: Yes), the ECU 11 maintains the grille shutters 84 in the open state until the longest one of the timer times To, which are each set for these components, until heat damage determination cancellation after IG-OFF is elapsed. Thereafter, the ECU 11 brings the grille shutters 84 into the closed state (the step S9: Yes, the step S10).

On the other hand, in a case where in the processing of the step S4 performed right before IG-OFF, it is determined for the heat damage target component that the heat damage will not occur upon IG-OFF (the step S6: No), when the grille shutters 84 are in the closed state upon IG-OFF, the ECU 11 maintains such a closed state (a step S8). Note that in a case where the grille shutters 84 are in the open state upon IG-OFF, the ECU 11 drives the actuator 18 to bring the grille shutters 84 into the closed state (the step S8). The grille shutter opening/closing control processing ends.

As described above, the grille shutter control device 10 of the vehicle of the present embodiment includes the encapsulation structure 30 exhibiting the heat insulating properties and covering the engine 2 (see FIGS. 1 to 3), and includes the ECU 11 as the grille shutter opening/closing controller configured to control opening/closing of the grille shutters 84 provided at the encapsulation structure 30 (see FIG. 4). It is determined whether or not the heat damage will occurs on, e.g., the $O_2$ sensor 25 and the exhaust shutter valve 26 as the components (the engine-related components) relating to the engine 2 upon IG-OFF (key-OFF) (the step S4 of FIG. 5). In a case where it is determined that the heat damage will not occur (the step S6 of FIG. 5: No), the grille shutters 84 are closed upon IG-OFF (the step S8 of FIG. 5). On the other hand, in a case where it is determined that the heat damage will occur (the step S6 of FIG. 5: Yes), the grille shutters 84 are opened upon IG-OFF (the step S7 of FIG. 5).

According to the above-described configuration, in a case where it is determined that the heat damage will not occur, the grille shutters 84 are closed upon IG-OFF so that the heat retaining properties of the engine room E covered with the encapsulation structure 30 can be ensured. As a result, fuel consumption can be improved by quick warming upon engine re-start.

On the other hand, in a case where it is determined that the heat damage will occur, the grille shutters 84 are opened upon IG-OFF so that the heat damage on, e.g., the $O_2$ sensor 25 and the exhaust shutter valve 26 as the engine-related components can be reduced.

In one embodiment, the structure is employed, in which the electric drive type exhaust shutter valve 26 is provided at the exhaust pipe 22 of the tunnel underspace 94 (below a floor tunnel) (see FIG. 1) and the tunnel cover 38 is provided below the exhaust pipe 22 (see FIGS. 1 and 3). The encapsulation structure 30 includes the tunnel cover 38, and the engine-related components include the exhaust shutter valve 26.

According to the above-described configuration, in a case where it is determined that the heat damage will occur, the grille shutters 84 are opened upon IG-OFF so that the heat damage on the exhaust shutter valve 26 can be reduced even when the tunnel cover 38 is provided below the exhaust pipe 22. On the other hand, in a case where it is determined that the heat damage will not occur, the grille shutters 84 are closed upon IG-OFF so that heat can be, including the tunnel underspace 94, retained not only in the engine room E but also in the tunnel cover 38.

In addition, the tunnel cover 38 is provided below the exhaust pipe 22 so that the aerodynamic performance below the tunnel portion 91 can be enhanced.

In one embodiment, the front through-hole opening 39f is provided at the portion of the tunnel cover 38 right below the exhaust shutter valve 26, and as viewed from the bottom, the clearance s is formed between the peripheral edge of the front through-hole opening 39f and the exhaust shutter valve 26 (see FIGS. 1, 3, and 8).

According to the above-described configuration, when the exhaust shutter valve 26 is covered with the tunnel cover 38 from below, there is a concern that the heat damage is on the exhaust shutter valve 26 due to the radiant heat from the exhaust pipe 22 to the exhaust shutter valve 26 through the tunnel cover 38 upon IG-OFF. However, the front through-hole opening 39f is provided at the portion of the tunnel cover 38 right below the exhaust shutter valve 26 so that the heat damage on the electric drive type exhaust shutter valve 26 upon IG-OFF can be reduced.

Further, the clearance s is ensured between the peripheral edge of the front through-hole opening 39f and the exhaust shutter valve 26 as viewed from the bottom. Thus, even when the tunnel cover 38 is provided below the exhaust pipe 22, the flow of heat from the clearance s to the openings 83 provided at the shroud panel 81 in the encapsulation structure 30 can be promoted upon opening of the grille shutters 84, and therefore, the heat can be efficiently discharged to the outside of the encapsulation structure 30. Even in the configuration in which the tunnel cover 38 is provided below the exhaust pipe 22, the heat damage on, e.g., the $O_2$ sensor 25 and the exhaust shutter valve 26 as the engine-related components upon IG-OFF can be reduced.

In one embodiment, in a case where it is determined that the heat damage will occur (the step S6 of FIG. 5: Yes), the grille shutters 84 at least in the open state upon IG-OFF are closed (the step S10 of FIG. 5) after heat damage determination cancellation (the step S9 of FIG. 5: Yes) in which the heat damage determined for the engine-related components (e.g., the $O_2$ sensor 25 and the exhaust shutter valve 26) is cancelled.

According to the above-described configuration, the grille shutters 84 are closed at the timing of heat damage determination cancellation upon IG-OFF, and thereafter, heat can be retained in the engine 2 and the related-components thereof.

In one embodiment, occurrence of the heat damage upon IG-OFF is determined based on the determined temperatures of the engine-related components (e.g., the $O_2$ sensor 25 and the exhaust shutter valve 26) while the vehicle is traveling. According to the determined degree of occurrence of the heat damage, the timer time To is set as the period of opening the grille shutters 84 upon IG-OFF (the step S4 of FIG. 5). Upon IG-OFF, the grille shutters 84 are opened for the timer time To (the step S9 of FIG. 5: No). After a lapse of the timer time To, the grille shutters 84 are closed (the step S9 of FIG. 5: Yes, S10).

According to the above-described configuration, the grille shutters 84 can be controlled only by timer control upon IG-OFF.

The technique disclosed herein is not limited only to the configuration of the above-described embodiment, and can be implemented in various embodiments.

For example, in a case where influence of the heat damage on the multiple heat damage target components are provided under the same conditions, heat damage occurrence determination as described above may be performed only for one (e.g., the heat damage target component with the lowest heat resistance temperature) of the multiple heat damage target components for which countermeasure against the heat damage needs to be taken the most.

The $O_2$ sensor 25 and the exhaust shutter valve 26 as the heat damage target components subjected to heat damage occurrence determination in the above-described embodiment will be described by way of example. The $O_2$ sensor 25 and the exhaust shutter valve 26 are both components provided as part of the exhaust system 20, and receive the influence of the heat damage under the substantially same conditions. Thus, heat damage occurrence determination may be performed only for the exhaust shutter valve 26 (e.g., having a lower heat resistance temperature) for which the countermeasure against the heat damage needs to be taken.

As described above, the ECU 11 of the present embodiment indirectly determines the temperature of the heat damage target component upon IG-OFF based on the engine water temperature, the accelerator opening degree, the engine speed, and the vehicle speed acquired from various sensors during traveling, and in this manner, determines the heat damage which might occur upon IG-OFF and the timer time To at which heat damage determination is cancelled.

As described above, occurrence of the heat damage after IG-OFF is determined during traveling based on the control amounts such as the engine water temperature, the accelerator opening degree, the engine speed, and the vehicle speed, and therefore, there is an advantage that, e.g., occurrence of the heat damage can be determined based on the input signals from the existing sensors normally provided at the vehicle without the need for separately providing a temperature sensor at the periphery of the heat damage target component to determine, e.g., occurrence of the heat damage after IG-OFF based on such a measured temperature.

Note that the technique disclosed herein is not limited to this configuration, and a configuration in which the temperature sensor configured to sense the temperature of the heat damage target component is provided at the periphery of the heat damage target component to detect, in real time, the temperature of the heat damage target component after IG-OFF and, e.g., occurrence of the heat damage after IG-OFF is directly determined based on the detection signal is not excluded.

The control amounts input from various sensors to the ECU 11 during traveling upon determination of, e.g., occurrence of the heat damage on the heat damage target component upon IG-OFF are not limited to at least one of the engine water temperature, the accelerator opening degree, the engine speed, and the vehicle speed, and other control amounts may be used.

For example, in addition to the above-described control amounts, at least one of the following control amounts may be used as the control amount: actual engine torque detected by a torque sensor; a throttle valve opening degree detected by a throttle opening degree sensor; the amount of intake air in an intake pipe, the amount being detected by an air flow sensor; an intake air pressure in an intake manifold, the intake air pressure being detected by an intake air pressure sensor; the temperature of lubricant oil in a transmission, the temperature being detected by a transmission oil temperature sensor for calculating an air-fuel ratio of an air-fuel mixture; and an oxygen concentration in exhaust gas, the oxygen concentration being detected by an $O_2$ sensor.

The engine-related components, i.e., the heat damage target components, targeted for determination of occurrence of the heat damage as described above are not limited to the $O_2$ sensor 25 and the exhaust shutter valve 26, and other components (other exhaust system components) of the exhaust system 20 may be employed. Alternatively, components forming each of an intake device, a lubrication device, a cooling device, and a combustion device of the engine 2 may be employed, for example.

What is claimed is:

1. A grille shutter control device of a vehicle, comprising:
   a grille shutter provided at an opening;
   an actuator configured to move the grille shutter to open/close the opening; and
   a controller configured to control the actuator,
   wherein the opening is formed at a front wall portion of an encapsulation structure exhibiting a heat insulating property and covering an engine,
   the controller
     determines whether or not heat damage occurs on a related component relating to the engine upon key OFF,
     closes the grille shutter upon key OFF in a case of determining that the heat damage will not occur, and
     opens the grille shutter upon key OFF in a case of determining that the heat damage will occur,
   the encapsulation structure includes a tunnel cover arranged below an exhaust pipe below a floor tunnel, and
   the related component includes an electric drive type exhaust shutter valve provided at the exhaust pipe.

2. The grille shutter control device of the vehicle according to claim 1, wherein
   a through-hole opening is provided at a portion of the tunnel cover right below the exhaust shutter valve, and
   as viewed from a bottom, a clearance is formed between a peripheral edge of the through-hole opening and the exhaust shutter valve.

3. The grille shutter control device of the vehicle according to claim 1, wherein
   in the case of determining that the heat damage will occur, the controller closes the grille shutter after heat damage determination cancellation in which the heat damage determined for the related component is cancelled.

4. The grille shutter control device of the vehicle according to claim 3, wherein
the controller
determines occurrence of the heat damage upon key OFF based on a determined temperature of the related component while the vehicle is traveling,
sets an opening period of the grille shutter upon key OFF according to a determined degree of occurrence of the heat damage, and
opens the grille shutter for the opening period upon key OFF, and thereafter, closes the grille shutter.

5. A grille shutter control device of a vehicle, comprising:
a grille shutter provided at an opening;
an actuator configured to move the grille shutter to open/close the opening; and
a controller configured to control the actuator,
wherein the opening is formed at a front wall portion of an encapsulation structure exhibiting a heat insulating property and covering an engine,
the controller
determines whether or not heat damage occurs on a related component relating to the engine upon key OFF,
closes the grille shutter upon key OFF in a case of determining that the heat damage will not occur, and opens the grille shutter upon key OFF in a case of determining that the heat damage will occur,
in the case of determining that the heat damage will occur, the controller closes the grille shutter after heat damage determination cancellation in which the heat damage determined for the related component is cancelled, and
the controller
determines occurrence of the heat damage upon key OFF based on a determined temperature of the related component while the vehicle is traveling,
sets an opening period of the grille shutter upon key OFF according to a determined degree of occurrence of the heat damage, and
opens the grille shutter for the opening period upon key OFF, and thereafter, closes the grille shutter.

6. The grille shutter control device of the vehicle according to claim 5, wherein
a through-hole opening is provided at a portion of the tunnel cover right below the exhaust shutter valve, and
as viewed from a bottom, a clearance is formed between a peripheral edge of the through-hole opening and the exhaust shutter valve.

* * * * *